United States Patent
Kim et al.

(10) Patent No.: US 9,917,945 B2
(45) Date of Patent: Mar. 13, 2018

(54) IN-SERVICE MONITORING OF VOICE QUALITY IN TELECONFERENCING

(71) Applicant: DOLBY LABORATORIES LICENSING CORPORATION, San Francisco, CA (US)

(72) Inventors: Doh-Suk Kim, Cupertino, CA (US); Jean-Francois Catz, Eguilles (FR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/315,183

(22) PCT Filed: Jun. 15, 2015

(86) PCT No.: PCT/US2015/035855
§ 371 (c)(1),
(2) Date: Nov. 30, 2016

(87) PCT Pub. No.: WO2015/195564
PCT Pub. Date: Dec. 23, 2015

(65) Prior Publication Data
US 2017/0104867 A1    Apr. 13, 2017

Related U.S. Application Data

(60) Provisional application No. 62/012,767, filed on Jun. 16, 2014.

(30) Foreign Application Priority Data

Jul. 16, 2014  (EP) .................................. 14177308

(51) Int. Cl.
*H04M 1/24*  (2006.01)
*H04M 3/08*  (2006.01)
(Continued)

(52) U.S. Cl.
CPC ......... *H04M 3/2236* (2013.01); *H04M 3/568* (2013.01)

(58) Field of Classification Search
CPC ....... H04L 65/80; H04L 65/403; H04L 69/24; H04L 43/0829; H04L 45/74;
(Continued)

(56) References Cited

U.S. PATENT DOCUMENTS 6,571,285 B1   5/2003  Groath
6,741,569 B1   5/2004  Clark
(Continued)

FOREIGN PATENT DOCUMENTS

EP   1536660     4/2008
WO   2002/035844  5/2002

OTHER PUBLICATIONS

Manousos, M. et al "Voice-Quality Monitoring and Control for VoIP" IEEE Internet Computing, vol. 9, Issue 4, Jul.-Aug. 2005, pp. 35-42.
(Continued)

*Primary Examiner* — Binh K Tieu (57) ABSTRACT

A voice quality estimation process may be triggered by receiving one or more alarms corresponding to one or more endpoint terminals being used during a teleconference. The alarm(s) may include uplink transmission alarms, downlink transmission alarms and/or acoustic quality alarms. The alarms may be based on evaluating transmission metrics and/or acoustic quality metrics. The voice quality estimation process may require a relatively greater computational burden than the processes of evaluating the transmission metrics and/or acoustic quality metrics for the purpose of potentially triggering an alarm. The accuracy and computational complexity of voice quality estimation may be adjusted by selecting times during which alarm detection
(Continued)

will take place, alarm detector thresholds, alarm analyzer thresholds and/or levels of voice quality estimation.

17 Claims, 8 Drawing Sheets

(51) Int. Cl.
  *H04M 3/22* (2006.01)
  *H04M 3/56* (2006.01)
(58) Field of Classification Search
  CPC ..... H04L 47/2441; H04L 47/30; H04L 47/34; H04M 3/2236; H04M 7/006; H04M 7/0084; H04M 3/56
  USPC ...... 379/1.01, 1.04, 9, 9.03, 9.04, 12, 22.08, 379/27.01, 27.03, 27.04, 32.01, 32.04, 379/202.01, 203.01, 23.03; 370/232, 235, 370/241, 248, 251, 252, 260
  See application file for complete search history.

(56) References Cited

U.S. PATENT DOCUMENTS

| | | | |
|---|---|---|---|
| 7,046,636 B1 | 5/2006 | Shaffer | |
| 7,167,451 B1 | 1/2007 | Oran | |
| 7,430,179 B2 | 9/2008 | Towns-von Stauber | |
| 7,475,003 B1 | 1/2009 | Madhusudhana | |
| 7,508,817 B2 | 3/2009 | Huang | |
| 7,782,802 B2 | 8/2010 | Moore | |
| 7,839,803 B1 * | 11/2010 | Snelgrove | H04M 3/56 370/235 |
| 7,974,212 B2 | 7/2011 | Leung | |
| 8,140,980 B2 | 3/2012 | Gunasekar | |
| 8,165,109 B2 | 4/2012 | King | |
| 8,176,154 B2 | 5/2012 | Minhazuddin | |
| 8,275,843 B2 | 9/2012 | Anantharaman | |
| 8,295,191 B2 | 10/2012 | Leung | |
| 8,300,536 B2 | 10/2012 | Hughes | |
| 8,355,335 B2 | 1/2013 | Diethorn | |
| 8,395,994 B2 | 3/2013 | Stevenson | |
| 8,467,321 B1 * | 6/2013 | Groenjes | H04L 12/1827 370/260 |
| 2004/0179515 A1 * | 9/2004 | Kamani | H04L 12/5692 370/352 |
| 2005/0141493 A1 | 6/2005 | Hardy | |
| 2006/0023061 A1 | 2/2006 | Vaszary | |
| 2006/0221942 A1 | 10/2006 | Fruth | |
| 2007/0286347 A1 | 12/2007 | Moore | |
| 2007/0286351 A1 | 12/2007 | Ethier | |
| 2009/0204922 A1 | 8/2009 | Bhattacharjee | |
| 2009/0225670 A1 | 9/2009 | Leung | |
| 2009/0238085 A1 | 9/2009 | Khanduri | |
| 2010/0020940 A1 | 1/2010 | Zad-Issa | |
| 2011/0149013 A1 | 6/2011 | Khot | |
| 2011/0164855 A1 | 7/2011 | Crockett | |
| 2012/0082304 A1 | 4/2012 | Byrne | |
| 2012/0300646 A1 | 11/2012 | Sloyer | |
| 2013/0162756 A1 | 6/2013 | Ellison | |
| 2014/0177461 A1 * | 6/2014 | Seyedmehdi | H04B 7/026 370/252 |
| 2015/0207710 A1 * | 7/2015 | Dickins | H04L 65/80 370/252 |

OTHER PUBLICATIONS

Senthil, Kumar Mani "DSP Subsystem for Multiparty Conferencing in VoIP" IEEE International Conference on Internet Multimedia Services Architecture and Applications, Dec. 9-11, 2009, pp. 1-6.

Costantini, D. et al "PreQuEst: A Scalable and Proactive Quality Enrichment for Presence Services" IEEE International Conference on Communications, Jun. 14-18, 2009, pp. 1-6.

Park, Ju-Won et al "Quality Monitoring for Real-Time IP Media Transport over Multi-Point Delivery Environment" IEEE Transactions on Consumer Electronics, vol. 54, Issue 4, Nov. 2008, pp. 2060-2067.

* cited by examiner

IN-SERVICE MONITORING OF VOICE QUALITY IN TELECONFERENCING

CROSS-REFERENCE TO RELATED APPLICATIONS

This application claims priority to U.S. Provisional Patent Application No. 62/012,767 filed 16 Jun. 2014 and European Patent Application No. 14177308.5 filed 16 Jul. 2014, which are both hereby incorporated by reference in their entirety.

TECHNICAL FIELD

This disclosure relates to teleconferencing. In particular, this disclosure relates to monitoring voice quality during a teleconference.

BACKGROUND

Teleconferences are generally conducted over packet networks. Voice transmission over packet networks is subject to packet loss and delay variation, the latter of which is commonly known as "jitter." In Internet Protocol (IP)-based networks, a fixed delay can be attributed to algorithmic, processing and propagation delays due to material and distance, whereas a variable delay may be caused by the fluctuation of IP network traffic, different transmission paths over the Internet, etc. VoIP (voice over Internet Protocol) receivers generally rely on a "jitter buffer" to counter the negative impact of jitter. By introducing an additional delay between the time a packet of audio data is received and the time that the packet is reproduced, a jitter buffer aims at transforming the uneven flow of arriving packets into a regular flow of packets, such that delay variations will not cause perceptual sound quality degradation to the end users.

Maintaining adequate acoustic quality during teleconferences also can be challenging. Teleconference participants may be in a variety of environments and may use fixed endpoint terminals or mobile endpoint terminals, such as cellular telephones, smart phones, etc. Some environments may have a substantial amount of background noise, the intensity of which may vary over time. The environments also may cause acoustic echoes. It would be desirable to have improved methods and devices for monitoring voice quality during teleconferences.

SUMMARY

According to some implementations described herein, a method may involve monitoring voice quality of a teleconference. For example, some such methods may involve receiving a request for voice quality estimation from a teleconference alarm analyzer and, in response to receiving the request for voice quality estimation, determining a voice quality metric for an endpoint terminal being used during the teleconference. Determining the voice quality metric may involve analyzing transmission information and/or acoustic quality information.

In some examples, the request for voice quality estimation may have been triggered by a transmission alarm. The transmission alarm may have indicated that an analysis of a stream of voice data packets received during the teleconference determined that a transmission metric for the stream of voice data packets exceeded a first transmission threshold value. Determining the voice quality metric may require a greater computational burden than the analysis of the stream of voice data packets.

In some implementations, the method may involve receiving a stream of voice data packets during the teleconference and ascertaining a transmission metric for the stream of voice data packets. The transmission metric may correspond to packet loss information and/or jitter information. The method may involve determining whether the transmission metric exceeds a first transmission threshold value and sending a transmission alarm to the teleconference alarm analyzer if the transmission metric exceeds the first transmission threshold value. The transmission metric may be a downlink transmission metric or an uplink transmission metric. In some examples, determining the voice quality metric may require a greater computational burden than the computational burdens of ascertaining a transmission metric and determining whether the transmission metric exceeds a first transmission threshold value.

Some implementations may involve determining whether the transmission metric exceeds a second transmission threshold value. In some such examples, the transmission alarm may indicate whether the transmission metric exceeds the first transmission threshold value or the second transmission threshold value.

In some implementations, the method may involve receiving audio signals via a microphone system of the endpoint terminal. The audio signals may include voice signals of a teleconference participant. The method may involve ascertaining an acoustic quality metric for the audio signals. The acoustic quality metric may, for example, correspond to an echo indication and/or a background noise indication. The method may involve determining whether the acoustic quality metric exceeds a first acoustic quality threshold value and sending an acoustic quality alarm to an alarm analyzer if the acoustic quality metric exceeds the first acoustic quality threshold value.

In some examples, determining the voice quality metric may require a greater computational burden than the computational burdens of ascertaining the acoustic quality metric and/or of determining whether the acoustic quality metric exceeds a first acoustic quality threshold value. Some implementations may involve determining whether the acoustic quality metric exceeds a second acoustic quality threshold value. The acoustic quality alarm may indicate whether the acoustic quality metric exceeds the first acoustic quality threshold value or the second acoustic quality threshold value.

In some implementations, the sending process may involve sending an alarm to another device. In some instances, the sending process may involve sending diagnostic information. For example, the diagnostic information may include transmission information and/or acoustic quality information. In some implementations, the request for voice quality estimation may include diagnostic information.

In some implementations, determining the voice quality metric may involve analyzing at least one of the following types of information: downlink packet loss information for the endpoint terminal; downlink jitter information for the endpoint terminal; uplink packet loss information for another endpoint terminal; uplink jitter information for another endpoint terminal; codec bitstream information; local preprocessing status information obtained from the endpoint terminal; and/or remote preprocessing status information obtained from another endpoint terminal. In some instances, the request for voice quality estimation may indicate a level of voice quality estimation. For example, the request for voice quality estimation may indicate a degree of detail and/or complexity of a desired voice quality estimation process. In some such examples, the request for voice quality estimation may indicate which of the foregoing types of information should be analyzed. Accordingly, a level of voice quality estimation may correspond with a computational burden of determining the voice quality metric.

Various devices may be involved in determining the voice quality metric, depending on the particular implementation. In some implementations, for example, the endpoint terminal, a teleconference server or another endpoint terminal may determine the voice quality metric.

Alternative methods are disclosed herein. Some such methods involve monitoring voice quality of a teleconference. For example, a method may involve receiving one or more alarms that correspond to an endpoint terminal being used during a teleconference. The one or more alarms may, for example, include one or more uplink transmission alarms, downlink transmission alarms and/or acoustic quality alarms.

The method may involve analyzing (e.g., by an alarm analyzer) the one or more alarms to determine an alarm score. The method may involve determining whether the alarm score equals or exceeds an alarm score threshold. In some examples, the method may involve sending a request for voice quality estimation to at least one quality estimator module if the alarm score exceeds the alarm score threshold. According to some implementations, providing the voice quality estimation may require a greater computational burden than that of the alarm receiving, analyzing and determining processes.

The alarms may, for example, include a downlink transmission alarm and/or an acoustic quality alarm received from an endpoint terminal being used during the teleconference. In some instances, one or more alarms may indicate whether a metric exceeds at least one threshold value. In some instances, the method may involve receiving diagnostic information corresponding to the one or more alarms and including at least some of the diagnostic information with the request for voice quality estimation.

The method may involve determining a transmission metric for a stream of voice data packets. The transmission metric may correspond to packet loss information and/or jitter information. The method may involve ascertaining whether the transmission metric exceeds a first transmission threshold value and sending a transmission alarm to the alarm analyzer if the transmission metric exceeds the first transmission threshold value. In some instances, providing the voice quality estimation may require a greater computational burden than the computational burden of determining the transmission metric and/or ascertaining whether the transmission metric exceeds a first transmission threshold value.

Some implementations may involve determining whether the transmission metric exceeds a second transmission threshold value. The transmission alarm may, for example, indicate whether the transmission metric exceeds the first transmission threshold value or the second transmission threshold value.

In some examples, one or more endpoint terminals include a quality estimator module. The method may involve determining, (e.g., by the alarm analyzer), one or more endpoint terminals to which the request for voice quality estimation will be sent. In some instances, determining the one or more endpoint terminals to which the request for voice quality estimation will be sent may involve determining that the request for voice quality estimation will be sent to a $j^{th}$ endpoint terminal. For example, determining that the request for voice quality estimation will be sent to the $j^{th}$ endpoint terminal may involve determining at least one of the following conditions: a downlink transmission alarm from endpoint terminal j indicates a high alert; one or more uplink transmission alarms corresponding to endpoint terminals other than j indicate a high alert; a downlink transmission alarm from endpoint terminal j indicates medium alert and one or more uplink transmission alarms corresponding to endpoint terminals other than j indicate a medium alert; an acoustic quality alarm from endpoint terminal j indicates a high alert; and an acoustic quality alarm from endpoint terminal j indicates a medium alert and/or one or more downlink transmission alarms corresponding to endpoint terminals other than j indicate a medium alert.

In some implementations, a teleconference server may include a quality estimator module. Some such implementations may involve receiving, by the quality estimator module, the request for voice quality estimation and, in response to receiving the request for voice quality estimation, determining a voice quality metric for an endpoint terminal being used during the teleconference. Determining the voice quality metric may involve analyzing transmission information and/or acoustic quality information.

The request for voice quality estimation may indicate a level of voice quality estimation. The level of voice quality estimation may correspond with a computational burden of determining the voice quality metric. For example, the request for voice quality estimation may indicate that determining the voice quality metric will involve analyzing at least one type of the following information: downlink packet loss information for a first endpoint terminal; downlink jitter information for the first endpoint terminal; uplink packet loss information for a second endpoint terminal; uplink jitter information for a second endpoint terminal; codec bitstream information; preprocessing status information obtained from a first endpoint terminal; and/or preprocessing status information obtained from a second endpoint terminal. The first endpoint terminal and/or the second endpoint terminal may be an endpoint terminal to which a request for voice quality estimation will be sent.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some aspects of the subject matter described in this disclosure can be implemented in a non-transitory medium having software stored thereon. The software may include instructions for controlling at least one apparatus to perform, at least in part, one or more of the methods disclosed herein.

At least some aspects of the present disclosure may be implemented via apparatus. For example, one or more devices may be capable of performing, at least in part, the methods disclosed herein. In some implementations, an apparatus may include an interface system and a logic system. The interface system may include a network interface, an interface between the logic system and the memory system and/or an external device interface. The logic system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. The logic system may be capable of performing, at least in part, one or more of the methods disclosed herein.

For example, the logic system may include a quality estimator module capable of determining, in response to receiving a request for voice quality estimation via the interface system, a voice quality metric for an endpoint terminal being used during a teleconference. Determining the voice quality metric may involve analyzing transmission information and/or acoustic quality information.

In some implementations, the logic system may include an alarm analyzer capable of receiving, via the interface system, one or more alarms corresponding to an endpoint terminal being used during a teleconference. The one or more alarms may include one or more uplink transmission alarms, downlink transmission alarms and/or acoustic quality alarms. The alarm analyzer may be capable of analyzing the one or more alarms to determine an alarm score, of determining whether the alarm score exceeds an alarm score threshold and of sending a request for voice quality estimation to at least one quality estimator module if the alarm score exceeds the alarm score threshold.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular examples of voice quality monitoring during a teleconference, the teachings herein are widely applicable to other known voice quality monitoring implementations, as well as voice quality monitoring implementations that may be introduced in the future.

Figure 1:
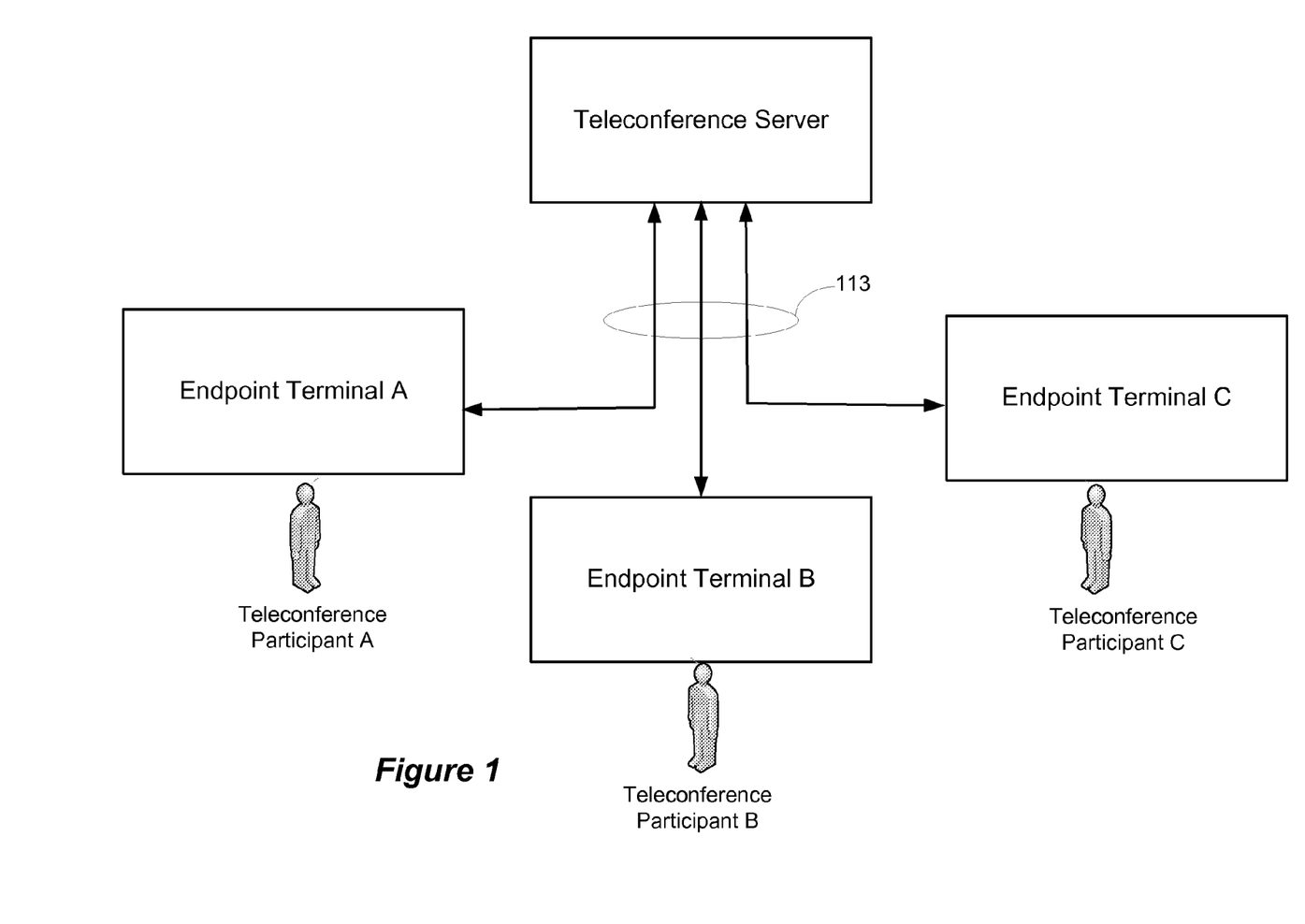
FIG. 1 is a block diagram illustrating an example of a voice communication system in which aspects of the application can be implemented.

FIG. 1 is a block diagram illustrating an example of a voice communication system in which aspects of the application can be implemented. As illustrated in FIG. 1, teleconference participant A operates an endpoint terminal A, teleconference participant B operates an endpoint terminal B and teleconference participant C operates an endpoint terminal C. Like other endpoint terminals shown and described herein, endpoint terminals A, B and C may, for example, include telephones, personal computers, mobile electronic devices (e.g., cellular telephones, smart phones, tablets, etc.) or the like that are capable of performing, at least in part, some or all of the methods disclosed herein. Endpoint terminals A, B and C may include a gateway capable of performing, at least in part, some or all of the methods disclosed herein. Endpoint terminals A, B and C may include components such as those described below with reference to FIGS. 2-6. Although three endpoint terminals are illustrated in FIG. 1, other implementations may involve more or fewer endpoint terminals.

In the example shown in FIG. 1, the endpoint terminals A, B, and C are capable of capturing audio waveforms, including the voice waveforms of each teleconference participant, digitizing the audio waveforms, compressing the digitized audio waveforms (e.g., via a voice encoder), packetizing the resulting compressed audio data and transmitting the audio data packets to the teleconference server. A transmission from an endpoint terminal to a teleconference server may be referred to herein as an "uplink transmission." The endpoint terminals A, B and C may be capable of including a "timestamp" or similar time metadata with a transmitted audio packet, indicating the transmission time of the audio packet. In the example shown in FIG. 1, the endpoint terminals A, B, and C may be configured for communication with a teleconference server through a common data link 113 or separate data links 113. The data link(s) 113 may be implemented as point-to-point connections or as a communication network.

In this example, the teleconference server is capable of mixing appropriate audio data packets and retransmitting the audio packets to endpoint terminals that are being used by teleconference participants. A transmission from teleconference server to an endpoint terminal may be referred to herein as a "downlink transmission." In some instances, for example, endpoint terminals A and B may be sending audio data packets to the teleconference server. The teleconference server may mix the audio data packets (either in the time domain or the frequency domain) before sending the mixed packets to endpoint terminal C. Whether the teleconference server performs such mixing may depend on various factors, such as bandwidth, whether the teleconference server is configured for mixing, whether mono or multi-channel is desired for endpoint terminal C, etc.

Real-time monitoring of voice quality (and/or performance in general) in teleconferencing systems is an important feature for analysis, management, and optimization of conference performance. However, it can be challenging to monitor the voice quality of a teleconference efficiently. Some voice quality monitoring systems may be based on analyzing packet transmission information, such as packet loss rate, packet loss patterns and/or jitter information, because analysis of such metrics provides a simple and computationally inexpensive way to estimate voice quality. However, systems that are based entirely on analyzing packet transmission information may provide low accuracy in estimating voice quality due to the lack of a mechanism to incorporate information contained in packet payloads.

In order to improve accuracy in estimating voice quality, some voice quality monitoring systems may be based on analyzing information in packet payloads for quality estimation. Implementing these more complex voice quality estimation processes can increase the accuracy of voice quality monitoring, but may increase the computational load to the system. This increased computational burden can be an important issue, especially when the voice quality estimation model is implemented in a mobile device, where less computational complexity is strongly preferred due to battery life constraints, or in a gateway, which may handle a large number of voice streams.

Accordingly, in some implementations described herein, a voice quality estimation process may be triggered by receiving one or more alarms (which may also be referred to herein as "alarm signals") corresponding to one or more endpoint terminals being used during a teleconference. The alarm(s) may, for example, include uplink transmission alarms, downlink transmission alarms and/or acoustic quality alarms. The alarms may be based on evaluating transmission metrics and/or acoustic quality metrics. For example, a downlink transmission alarm may indicate that one or more downlink transmission metrics, such as a downlink packet transmission delay metric, a downlink packet loss metric, etc., exceed a predetermined threshold. Similarly, an uplink transmission alarm may indicate that one or more uplink transmission metrics, such as an uplink packet transmission delay metric, an uplink packet loss metric, etc., exceed a predetermined threshold. An acoustic quality alarm may, for example, indicate that one or more acoustic quality metrics, such as acoustic echo indications and/or background noise indications, exceed a predetermined threshold. Various examples are provided below. The voice quality estimation process may require a relatively greater computational burden than the processes of evaluating the transmission metrics and/or acoustic quality metrics for the purpose of potentially triggering an alarm. The accuracy and computational complexity of voice quality estimation may be adjusted by selecting times during which alarm detection will take place, alarm detector thresholds, alarm analyzer thresholds and/or levels of voice quality estimation.

Figure 2:
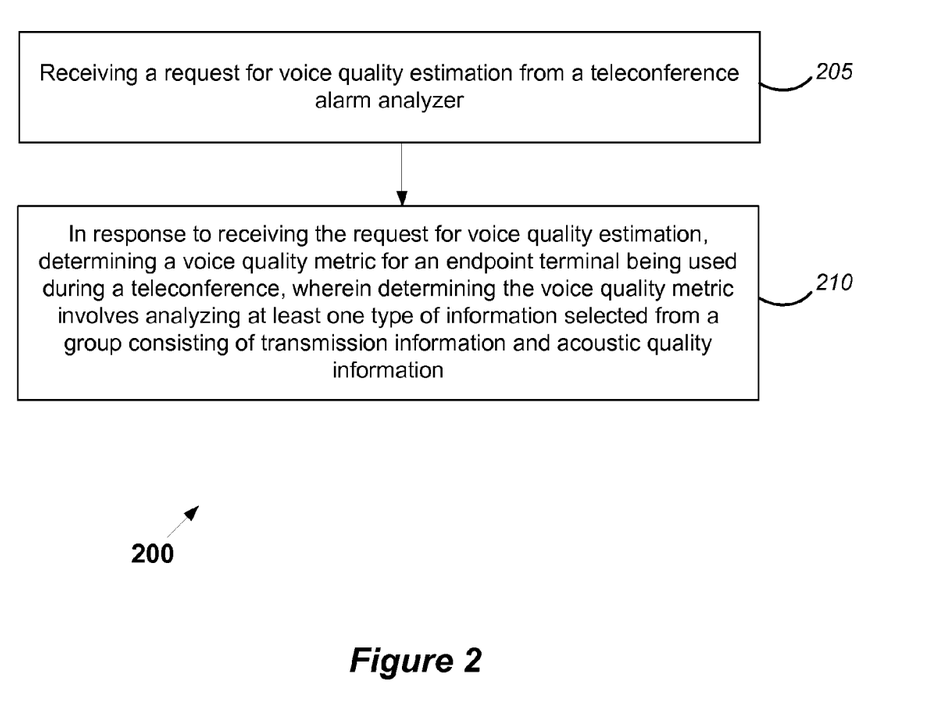
FIG. 2 is a flow diagram that illustrates blocks of some voice quality monitoring methods disclosed herein.

FIG. 2 is a flow diagram that illustrates blocks of some voice quality monitoring methods disclosed herein. As with other methods described herein, the blocks of method 200 are not necessarily performed in the order indicated. Moreover, some implementations of method 200 (and other methods disclosed herein) may include more or fewer blocks than indicated or described.

In this implementation, method 200 begins with block 205, which involves receiving a request for voice quality estimation from a teleconference alarm analyzer. In this example, the request for voice quality estimation is received by an endpoint terminal such as those disclosed elsewhere herein. In some examples, in response to receiving the request for voice quality estimation, a quality estimator module (QEM) of the endpoint terminal may be capable of determining a voice quality metric by analyzing transmission information and/or acoustic quality information (block 210).

However, in some implementations, method 200 may be performed (at least in part) by a teleconference server and/or by another device that is configured for communicating with endpoint terminals. In some such implementations, a teleconference server may include a QEM that is capable of determining a voice quality metric for an endpoint terminal being used during the teleconference.

Figure 3:
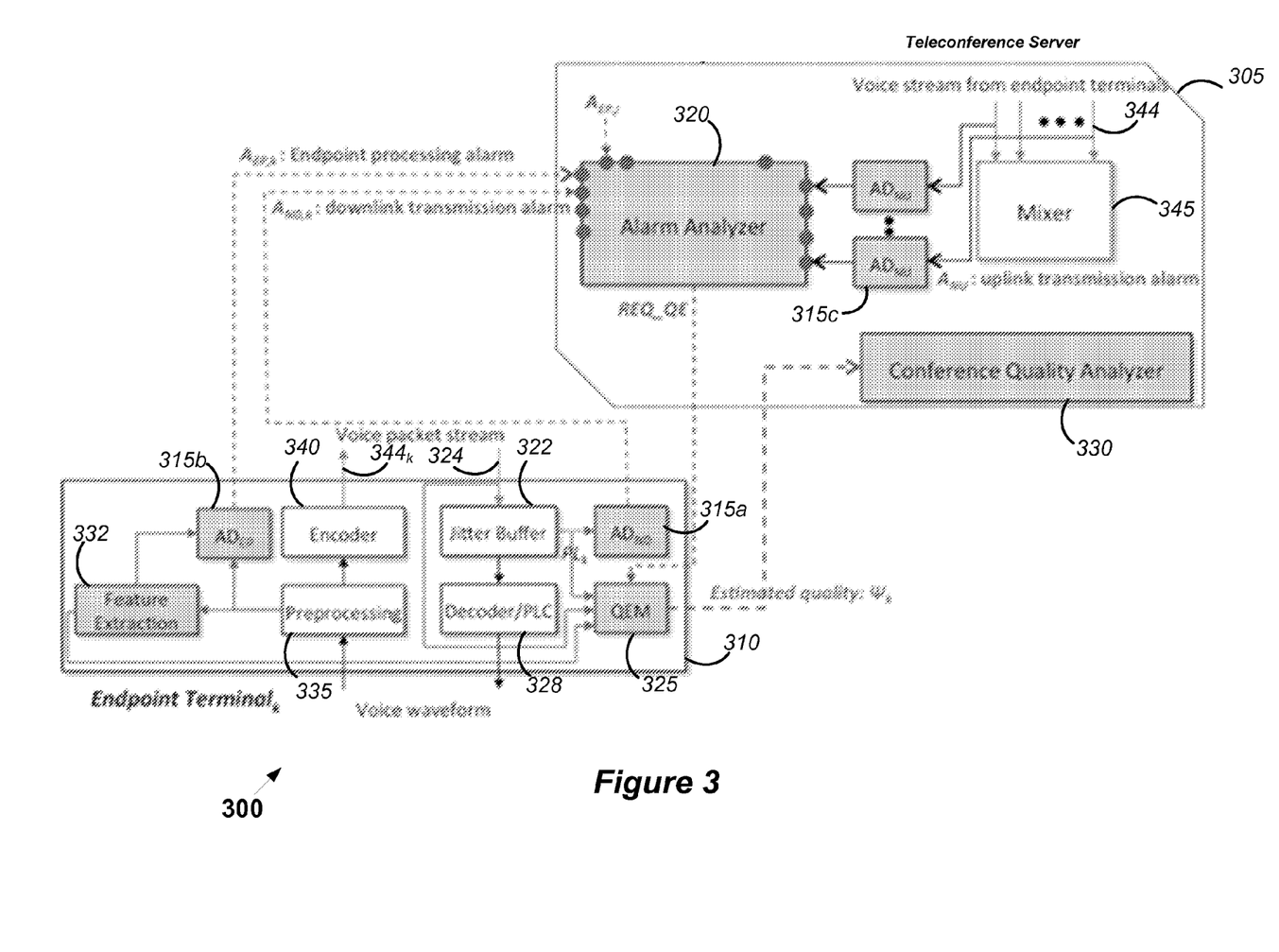
FIG. 3 is a block diagram illustrating a more detailed example of a voice communication system in which aspects of the application can be implemented.

FIG. 3 is a block diagram illustrating a more detailed example of a voice communication system in which aspects of the application can be implemented. In this example, the teleconferencing system 300 includes a teleconference server 305. The teleconferencing system 300 may include multiple endpoint terminals 310, only one of which is shown in FIG. 3. The endpoint terminals 310 may include a gateway and one or more communication terminals, such as telephones, computers and/or other suitable devices. In this implementation, the teleconferencing system 300 includes various types of alarm detectors 315, a teleconference alarm analyzer 320, a set of quality estimators 325 (only one of which is shown in FIG. 3) and a conference quality analyzer 330. In this example, the quality estimators 325 are implemented in the endpoint terminals. However, in some implementations the quality estimators 325 may be implemented in one or more other devices, such as the teleconference server 305.

Voice communication is highly sensitive to delay. According to ITU Recommendation G.114, for example, one-way delay should be kept below 150 ms for normal conversation, with above 400 ms being considered unacceptable. Accordingly, the endpoint terminals 310 include a jitter buffer module 322. The jitter buffer module 322 may be capable of analyzing the downlink voice data packet stream 324 during a teleconference to determine downlink transmission metrics such as downlink jitter information and downlink packet loss information.

Analyzing the downlink voice data packet stream 324 to determine the downlink transmission metrics may involve determining at least one of packet loss (PL) information (a signal corresponding to which is shown as $PL_k$ in FIG. 3), packet delay variation (PDV) information or inter-arrival time (IAT) variation information based, at least in part, on voice data packet arrival times. IAT variation may be measured according to the receive time difference of adjacent packets. PDV may, for example, be measured by reference to time intervals from a datum or "anchor" packet receive time. Here, the jitter buffer module 322 is capable of controlling a jitter buffer size according to the downlink transmission metrics. The jitter buffer module 322 may be capable of transforming an uneven flow of arriving downlink voice data packets into a more regular flow of packets to the decoder 328, to reduce the perceptual sound quality degradation caused by packet delay variations.

In this example, the alarm detector 315a is capable of receiving downlink transmission metrics from the jitter buffer module 322. The downlink transmission metrics may, for example, include PL information, PDV information and/or IAT variation information. Here, the alarm detector 315a (and/or the jitter buffer module 322) is capable of determining whether a downlink transmission metric exceeds a first downlink transmission threshold value. In this example, the alarm detector 315a is capable of sending a downlink transmission alarm signal to the teleconference alarm analyzer 320 if the downlink transmission metric exceeds the first downlink transmission threshold value. (The terms "alarm" and "alarm signal" are used interchangeably herein.) Accordingly, in this example the downlink transmission alarm is an indication that a downlink transmission metric exceeds a downlink transmission threshold value, which is the first downlink transmission threshold value in this instance. One such alarm is depicted in FIG. 3 as $A_{ND,k}$, which indicates a downlink transmission alarm from endpoint terminal k.

An alarm sent by the alarm detectors 315a, 315b or 315c may or may not indicate the severity of a problem, depending on the implementation. For example, some alarms may convey binary alarm indications, e.g., alarm/no alarm indications. In some such examples, only alarm indications will be sent to the alarm analyzer (a "no alarm" indication will not be sent). However, in some implementations, an alarm may include a code, such as a numerical value, indicating different degrees of alarm severity. In one such example, a numerical value of an alarm may correspond to a high alert, medium alert, and low or no alert. For example, the corresponding numerical values may be (3, 2, 1) or (2,1,0). Other implementations may involve different codes or numerical values, such as (4, 3, 2, 1) or (5, 4, 3, 2, 1), (5,4,3,2,1,0), (6,5,4,3,2,1,0), (7,6,5,4,3,2,1,0), etc.

Accordingly, in some implementations the alarm detector 315a (and/or the jitter buffer module 322) may be capable of determining whether a downlink transmission metric exceeds a second downlink transmission threshold value and/or other downlink transmission threshold values. A downlink transmission alarm may indicate whether the downlink transmission metric exceeds the first downlink transmission threshold value, the second downlink transmission threshold value, etc.

In this example, the endpoint terminals 310 are capable of performing VAD (Voice Activity Detection) on audio waveforms (including voice waveforms from a teleconference participant) captured by one or more microphones (not shown in FIG. 3). If a voice presence is detected in an audio block, corresponding processing (e.g., applying a gain suitable for voice data) may be performed on the audio block by preprocessing module 335 or by another component of a logic system of the endpoint terminal 310. If no voice presence is decided in an audio block, corresponding processing (e.g., applying a gain suitable for non-voice data) may be performed on the audio block. In this example, the preprocessing module 335 is capable of determining one or more types of acoustic quality metrics, such as acoustic echo indications and/or background noise indications. If the acoustic quality metrics indicate acoustic echoes and/or background noise, the preprocessing module 335 is capable of applying suitable audio processing countermeasures known in the art, such as echo suppression methods and/or noise suppression methods.

In this example, the endpoint 310 includes a feature extraction module 332 that is capable of receiving acoustic quality metric information from the preprocessing module 335. In this implementation, the feature extraction module 332 (and/or the preprocessing module 335) is capable of determining whether an acoustic quality metric exceeds a first acoustic quality threshold value. The acoustic quality metric may, for example, correspond with an echo indication and/or a background noise indication. In some implementations, the alarm detector 315b may be capable of determining whether the acoustic quality metric exceeds the first acoustic quality threshold value.

If the acoustic quality metric exceeds the first acoustic quality threshold value, in this implementation the alarm detector 315b is capable of sending an acoustic quality alarm to an alarm analyzer. As noted above, an alarm sent by the alarm detector 315b may or may not indicate the severity of a problem, depending on the implementation. For example, some alarms may convey binary alarm indications, e.g., alarm/no alarm indications. However, in some implementations, an alarm may include a code, such as a numerical value, indicating different degrees of alarm severity.

Accordingly, in some implementations the alarm detector 315b, the feature extraction module 332 and/or the preprocessing module 335 may be capable of determining whether an acoustic quality metric exceeds a second acoustic quality threshold value and/or other acoustic quality threshold values. An acoustic quality alarm may indicate whether the acoustic quality metric exceeds the first acoustic quality threshold value, the second acoustic quality threshold value, etc.

In FIG. 3, the teleconference server 305 is shown receiving an uplink voice data packet stream 344 from various endpoint terminals 310 that are involved in the teleconference. In this example, the teleconference server 305 includes a mixer 345 that is capable of mixing audio blocks corresponding to the same time, from each of the endpoint terminals 310 that are sending voice data packets corresponding to that time, into a mixed audio block. Copies of the mixed audio blocks may be transmitted to each of the endpoint terminals 310 that are involved in the teleconference. The teleconference server 305 may, for example, include timestamps with each of the mixed audio blocks.

In this implementation, the teleconference server 305 includes alarm detectors 315c. The alarm detectors 315c (and/or another component of the teleconference server 305, such as a jitter buffer module) may be capable of determining whether an uplink transmission metric of an uplink voice data packet stream 344 exceeds a first uplink transmission threshold value. The alarm detectors 315c may, for example, receive uplink transmission metric information from another component of the teleconference server, such as a jitter buffer module.

In this implementation, the alarm detectors 315c are capable of sending an uplink transmission alarm signal to the teleconference alarm analyzer 320 if the uplink transmission metric exceeds the first uplink transmission threshold value. Such alarms are depicted in FIG. 3 as $A_{NU}$. Such uplink transmission alarms may indicate a corresponding endpoint terminal. In some implementations the alarm detectors 315c (and/or another component of the teleconference server 305, such as a jitter buffer module) may be capable of determining whether an uplink transmission metric exceeds a second uplink transmission threshold value and/or other uplink transmission threshold values. An uplink transmission alarm may indicate whether the uplink transmission metric exceeds the first uplink transmission threshold value, the second uplink transmission threshold value, etc.

In some implementations, alarm signals may include, or may be accompanied by, diagnostic information. The diagnostic information may, for example, include transmission information (such as jitter information and/or packet loss information) and acoustic quality information (such as echo indications and/or background noise indications).

In the example shown in FIG. 3, the uplink transmission alarms, downlink transmission alarms and acoustic quality alarms are sent to an alarm analyzer 320. The alarm analyzer 320 may be capable of determining whether or not an alarm, or a combination of alarms, indicates a significant degree of audio quality degradation. In this implementation, the alarm analyzer 320 is implemented in the teleconference server 305. However, in alternative implementations, the alarm analyzer 320 may be implemented in another device. The device that implements the alarm analyzer 320 may, in some implementations, provide at least some of the other functionality of a teleconference server. For example, the alarm analyzer 320 may be implemented in an endpoint terminal 310 that provides some functionality of a teleconference server in a "peer-to-peer" configuration.

Figure 4A:
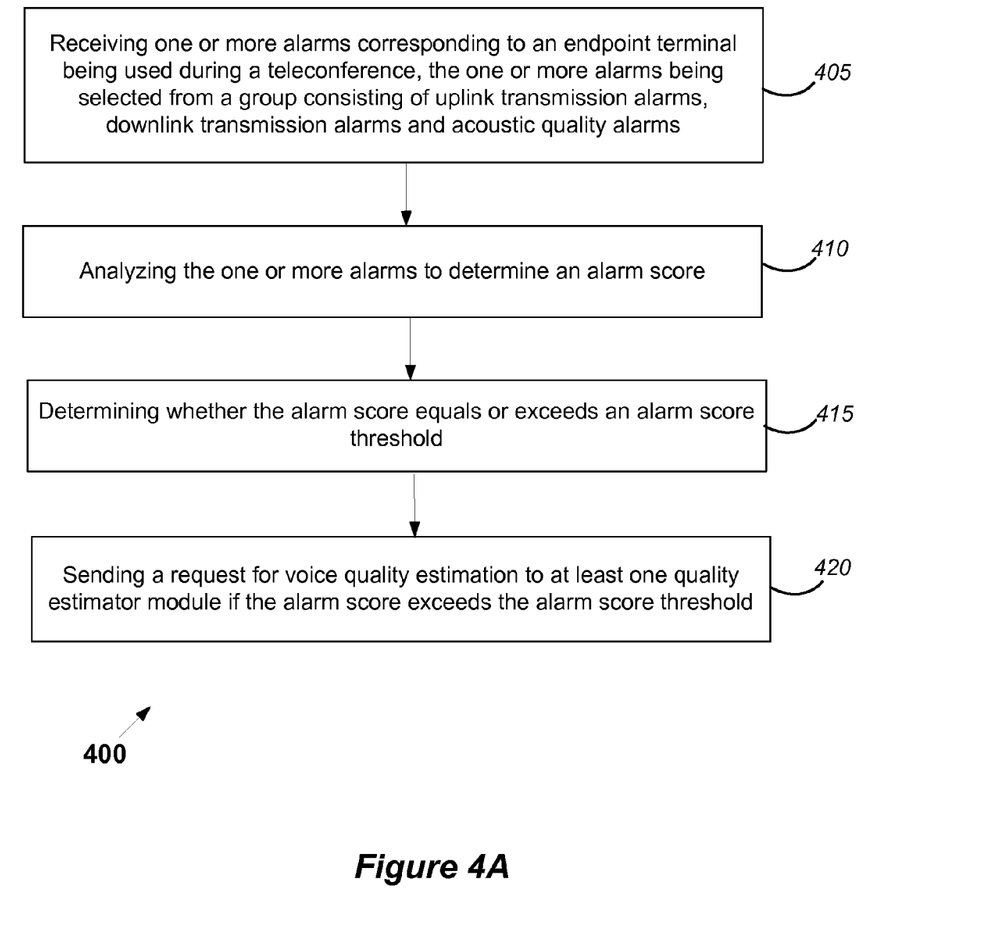
FIG. 4A is a flow diagram that that illustrates blocks of some alarm analyzer methods disclosed herein.

FIG. 4A is a flow diagram that that illustrates blocks of some alarm analyzer methods disclosed herein. Method 400 may, for example, be performed by an alarm analyzer implemented by a logic system of a teleconference server, an alarm analyzer implemented by a logic system of an endpoint terminal, etc. As with other methods described herein, the blocks of method 400 are not necessarily performed in the order indicated. Moreover, some implementations of method 400 (and other methods disclosed herein) may include more or fewer blocks than indicated or described.

In this implementation, method 400 begins with block 405, which involves receiving one or more alarms corresponding to one or more endpoint terminals being used during a teleconference. The alarms may include uplink transmission alarms, downlink transmission alarms and/or acoustic quality alarms. The alarm(s) may correspond to one or more endpoint terminals being used during the teleconference. In some implementations, the alarm(s) may indicate whether a metric, such as a transmission metric and/or an acoustic quality metric, exceeds at least one threshold value. In some implementations, block 405 may involve receiving diagnostic information corresponding to the one or more alarms.

In this example, block 410 involves analyzing, by the alarm analyzer, the one or more alarms to determine an alarm score. Block 410 also may involve analyzing diagnostic information associated with the alarms. Block 410 may correspond with a time window during which alarms are received. For example, in some implementations only alarms received within the time window may be evaluated to determine the alarm score. Alarms received within the next time window may be evaluated to determine a subsequent alarm score.

Here, block 415 involves determining whether the alarm score equals or exceeds an alarm score threshold. As noted above, in some implementations an alarm may include information (such as a code, e.g., a numerical value), indicating a degree of alarm severity. In one such example, a numerical value of an alarm may correspond to a high alert, medium alert, and low or no alert. For example, the corresponding numerical alarm values may be (3, 2, 1) or multiples thereof. The alarm threshold referenced in block 415 may correspond with such numerical alarm values.

For example, if the numerical alarm values are in the range of (3, 2, 1), corresponding with a high alert, a medium alert, and a low alert, in some implementations the alarm threshold may be set to 3. If an alarm analyzer receives (e.g., during a time window) a single alarm having a value of 3, the alarm analyzer may determine that the alarm score equals the alarm score threshold. If the alarm analyzer receives (e.g., during the time window) a single alarm having a value of 2, or two alarms having a value of 1, the alarm analyzer may determine that the alarm score does not equal or exceed the alarm score threshold. In alternative examples, method 400 may involve evaluating different numerical alarm values (such as the numerical alarm values described above, for example), applying different thresholds, etc.

In this example, block 420 involves sending a request for voice quality estimation to at least one quality estimator module if the alarm score exceeds the alarm score threshold. In some implementations, the request for voice quality estimation may include, or may be accompanied by, diagnostic information corresponding to the one or more alarms received in block 405.

In some implementations, an alarm analyzer may be capable of determining whether an alarm from a particular endpoint terminal (for example, the $k^{th}$ endpoint terminal 310 shown in FIG. 3) is potentially degrading audio quality for other teleconference participants. The alarm analyzer may, in some examples, be capable of determining endpoint terminal or terminals to which (or about which) requests for voice quality estimation may be sent.

For example, in determining to which endpoint terminals a request for voice quality estimation should be sent, an alarm analyzer may evaluate all the alarms (and, in some implementations, diagnostic information) received within a time window. Following are examples of conditions which may cause a request for voice quality estimation to be sent to a $j^{th}$ endpoint terminal:

1. A downlink transmission alarm from endpoint terminal j indicates a high alert;
2. One or more uplink transmission alarms corresponding to endpoint terminals other than j indicate a high alert;
3. A downlink transmission alarm from endpoint terminal j indicates medium alert and one or more uplink transmission alarms corresponding to endpoint terminals other than j indicate a medium alert;
4. An acoustic quality alarm from endpoint terminal j indicates a high alert; or
5. An acoustic quality alarm from endpoint terminal j indicates a medium alert and one or more downlink transmission alarms corresponding to endpoint terminals other than j indicate a medium alert.

The combination of alarms noted in example 3 may indicate a high risk of composite network impairment, due to a combination of medium level impairments of transmissions from endpoint terminal k to the teleconference server (uplink transmissions) and from the teleconference server to endpoint terminal j (downlink transmissions). In alternative examples, other combinations of alarm types, alarm levels, etc., may trigger sending a request for voice quality estimation to one or more endpoint terminals.

Figures 4B, 4C:
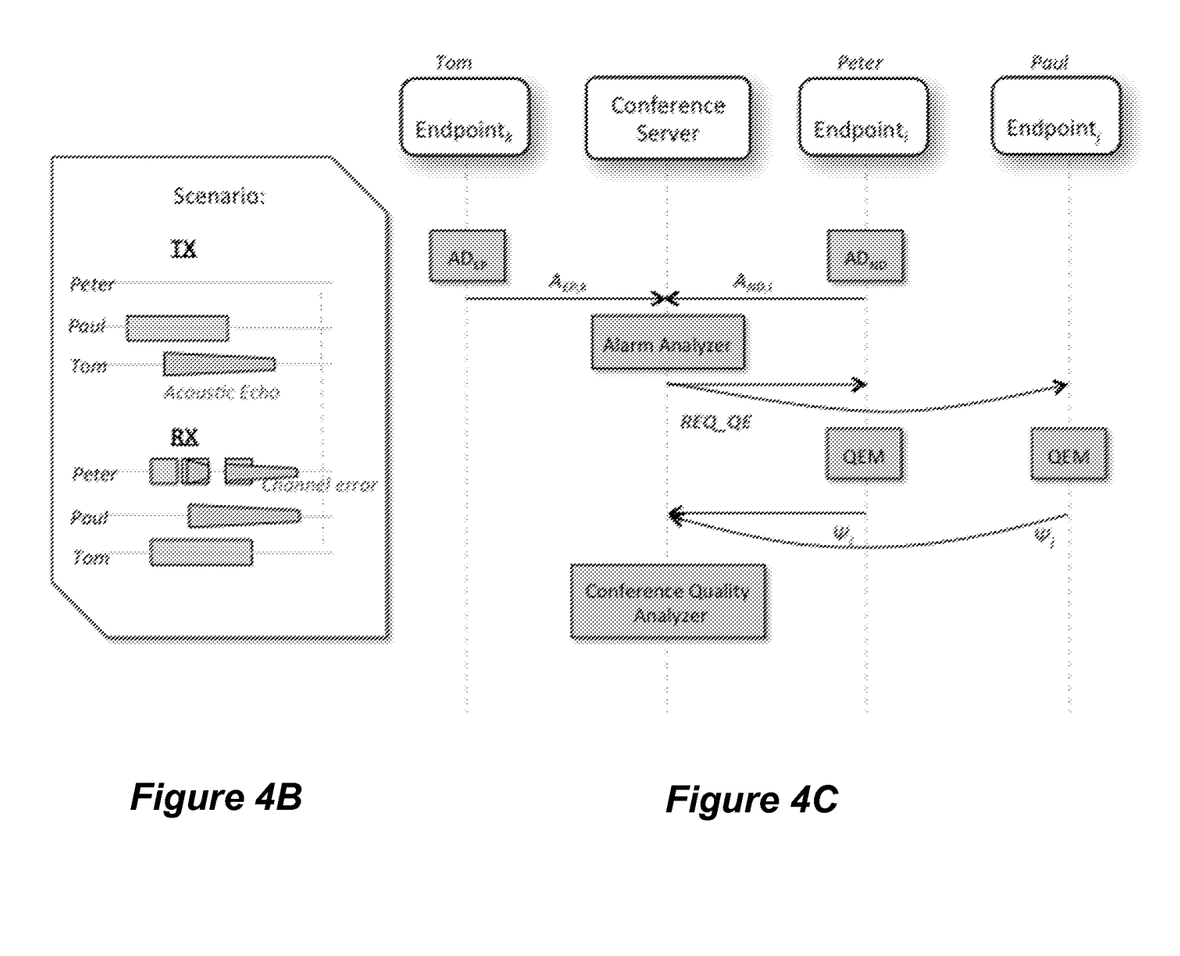
FIGS. 4B and 4C provide an example of the triggering of requests for voice quality estimation by an alarm analyzer.

FIGS. 4B and 4C provide an example of the triggering of requests for voice quality estimation by an alarm analyzer. FIG. 4B illustrates an example of a teleconferencing scenario in which the speech from teleconference participant Paul is transmitted to the endpoint terminals used by teleconference participants Peter and Tom. The endpoint terminal being used by Tom (Endpoint$_k$) has a very poor acoustic coupling (or poor acoustic echo canceller), resulting in severe echo generated and transmitted back to the endpoint terminals used by teleconference participants Peter (Endpoint) and Paul (Endpoint). The endpoint terminal being used by Peter (Endpoint) has a poor downlink channel and is experiencing severe packet loss.

FIG. 4C is a timing diagram for the scenario indicated in FIG. 4B, according to one example. Here, the conditions noted above cause an acoustic quality alarm to be generated by Endpoint$_k$ and a downlink transmission alarm to be generated by Endpoint$_i$. An alarm analyzer of the teleconference server evaluates the acoustic quality alarm and the downlink transmission alarm. In response, the alarm analyzer causes a request for voice quality estimation to be sent to Endpoint$_i$ and Endpoint$_j$.

Accordingly, quality estimation modules of Endpoint$_i$ and Endpoint$_j$ determine voice quality metrics corresponding to the requests for voice quality estimation and cause the voice quality metrics to be sent to the teleconference server. Determining the voice quality metrics may involve analyzing transmission information and acoustic quality information. Determining the voice quality metrics may require a greater computational burden than the processes involved with generating the acoustic quality alarm or generating the downlink transmission alarm. Determining the voice quality metrics may involve analyzing downlink packet loss information for the endpoint terminal; downlink jitter information for the endpoint terminal; uplink packet loss information for another endpoint terminal; uplink jitter information for another endpoint terminal; codec bitstream information; local preprocessing status information obtained from the endpoint terminal; and/or remote preprocessing status information obtained from another endpoint terminal.

The teleconference server may take appropriate action according to the voice quality metrics. In this example, the teleconference server stores the voice quality metrics in a conference quality analyzer for possible future reference.

In some examples, an alarm analyzer may be capable of selecting a level of voice quality estimation and of indicating that level in one or more requests for voice quality estimation. The level of voice quality estimation may correspond with the computational burden of responding to the request (s) for voice quality estimation. The alarm analyzer may, for example, be capable of selecting an appropriate level of voice quality estimation from a plurality of levels, each level corresponding with a degree of accuracy and/or an associated computational burden.

For example, the request for voice quality estimation may indicate that estimating voice quality will involve analyzing one or more of the following types of information: downlink packet loss information for a first endpoint terminal; downlink jitter information for the first endpoint terminal; uplink packet loss information for a second endpoint terminal; uplink jitter information for a second endpoint terminal; codec bitstream information; preprocessing status information obtained from a first endpoint terminal; and preprocessing status information obtained from a second endpoint terminal. In some implementations, low levels of voice quality estimation may correspond with analyzing only one or two such types of information, whereas high levels of voice quality estimation may correspond with analyzing only three, four, five or more such types of information.

In some implementations, the frequency and accuracy of voice quality estimation may be controlled by adjusting the sensitivity of alarm detectors. If an alarm detector has a lower threshold (higher sensitivity), in some implementations more alarms may be sent to an alarm analyzer. Conversely, if an alarm detector has a higher threshold (lower sensitivity), fewer alarms may be sent to the alarm analyzer. Because the requests for voice quality estimation are triggered by alarm detection, decreasing the sensitivity of alarm detectors may cause fewer requests for voice quality estimation.

Figure 4D:
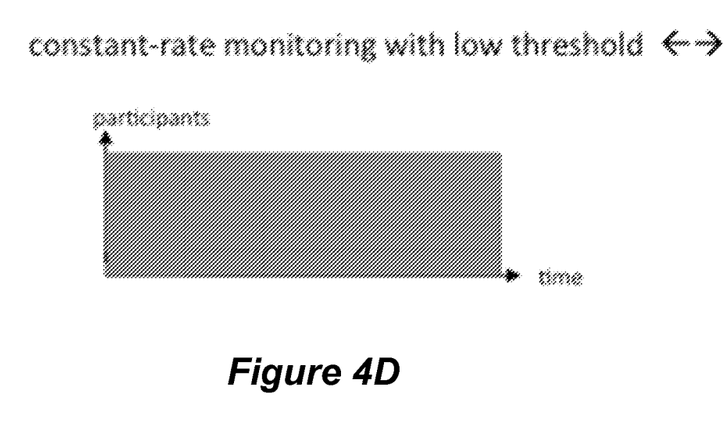
FIGS. 4D and 4E are graphs that show examples of constant and sparse voice quality monitoring, respectively.
Figure 4E:
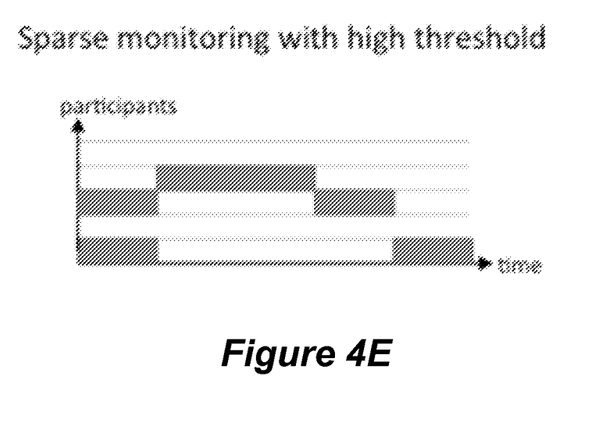

FIGS. 4D and 4E are graphs that show examples of constant and sparse voice quality monitoring, respectively. FIG. 4D represents a teleconferencing system configuration wherein the alarm detectors of endpoint terminals for all participants are continuously on. Moreover, in this configuration, the alarm detectors are configured with a relatively low threshold (high sensitivity). FIG. 4E represents a teleconferencing system configuration wherein the alarm detectors of endpoint terminals for all participants are intermittently on. In this example, the alarm detectors are configured with relatively high thresholds (low sensitivity). Accordingly, relatively more alarms may be sent to an alarm analyzer in the teleconferencing system configuration represented by FIG. 4D than to an alarm analyzer in the teleconferencing system configuration represented by FIG. 4E.

By "tuning" a teleconferencing system configuration to states between, and including, the endpoints represented by FIGS. 4D and 4E, trade-offs between complexity and accuracy in voice quality monitoring can be achieved. The sensitivity of an alarm detector can be set to a fixed value, or can be dynamically adjusted, e.g., to meet a predefined operational cost in computation. Accordingly, the accuracy and computational burden of voice quality estimation can be adjusted by selecting times during which alarm detection will take place, alarm detector thresholds, alarm analyzer thresholds and/or levels of voice quality estimation.

Figure 5:
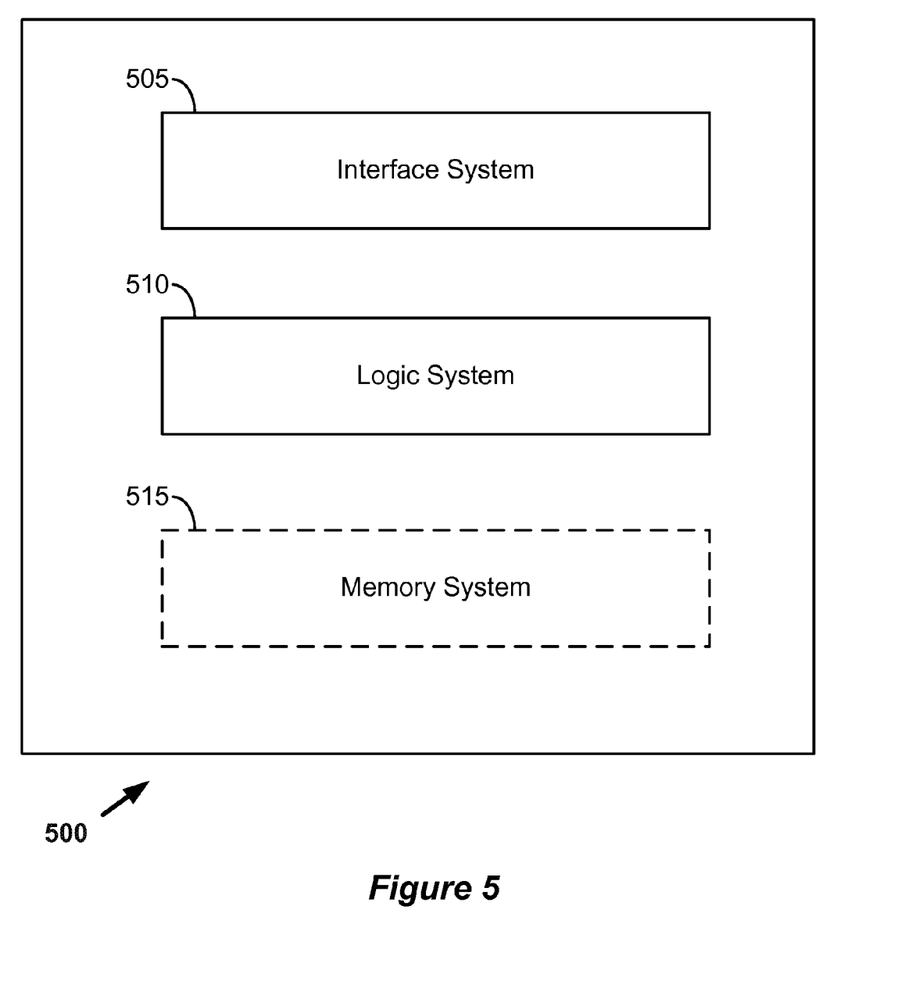
FIG. 5 is a block diagram that provides examples of components of an apparatus capable of implementing various aspects of this disclosure.

FIG. 5 is a block diagram that provides examples of components of an apparatus capable of implementing various aspects of this disclosure. The apparatus 500 may, for example, be (or may be a portion of) an endpoint terminal, a server, etc. In some examples, the apparatus may be implemented in a component of another device. For example, in some implementations the apparatus 500 may be a line card.

In this example, the apparatus 500 includes an interface system 505 and a logic system 510. The logic system 510 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In this example, the apparatus 500 includes a memory system 515. The memory system 515 may include one or more suitable types of non-transitory storage media, such as flash memory, a hard drive, etc. The interface system 505 may include a network interface, an interface between the logic system and the memory system and/or an external device interface (such as a universal serial bus (USB) interface).

In this example, the logic system 510 is capable of receiving audio data packets and other information via the interface system 505. In some implementations, the logic system 510 may include (or may implement), a quality estimator module. Accordingly, the logic system 510 may be capable of performing quality estimator module functionality as described herein. For example, in some implementations the logic system 510 may be capable of determining, in response to receiving a request for voice quality estimation via the interface system 505, a voice quality metric for an endpoint terminal being used during a teleconference. Determining the voice quality metric may involve analyzing transmission information and/or acoustic quality information.

In some implementations, the logic system 510 may provide alarm analyzer functionality. According to some such implementations, the logic system 510 may include an alarm analyzer capable of receiving, via the interface system 505, one or more alarms. The alarm(s) may correspond to one or more endpoint terminals being used during a teleconference. The alarm(s) may include uplink transmission alarms, downlink transmission alarms and/or acoustic quality alarms. The alarm analyzer may be capable of analyzing the one or more alarms to determine an alarm score. In some examples, the alarm analyzer may be capable of determining whether the alarm score exceeds an alarm score threshold. The alarm analyzer may be capable of sending a request for voice quality estimation to at least one quality estimator module if the alarm score exceeds the alarm score threshold.

In some implementations, the logic system 510 may be capable of performing quality estimator module functionality and/or alarm analyzer functionality as described herein according to software stored one or more non-transitory media. The non-transitory media may include memory associated with the logic system 510, such as random access memory (RAM) and/or read-only memory (ROM). The non-transitory media may include memory of the memory system 515.

Figure 6:
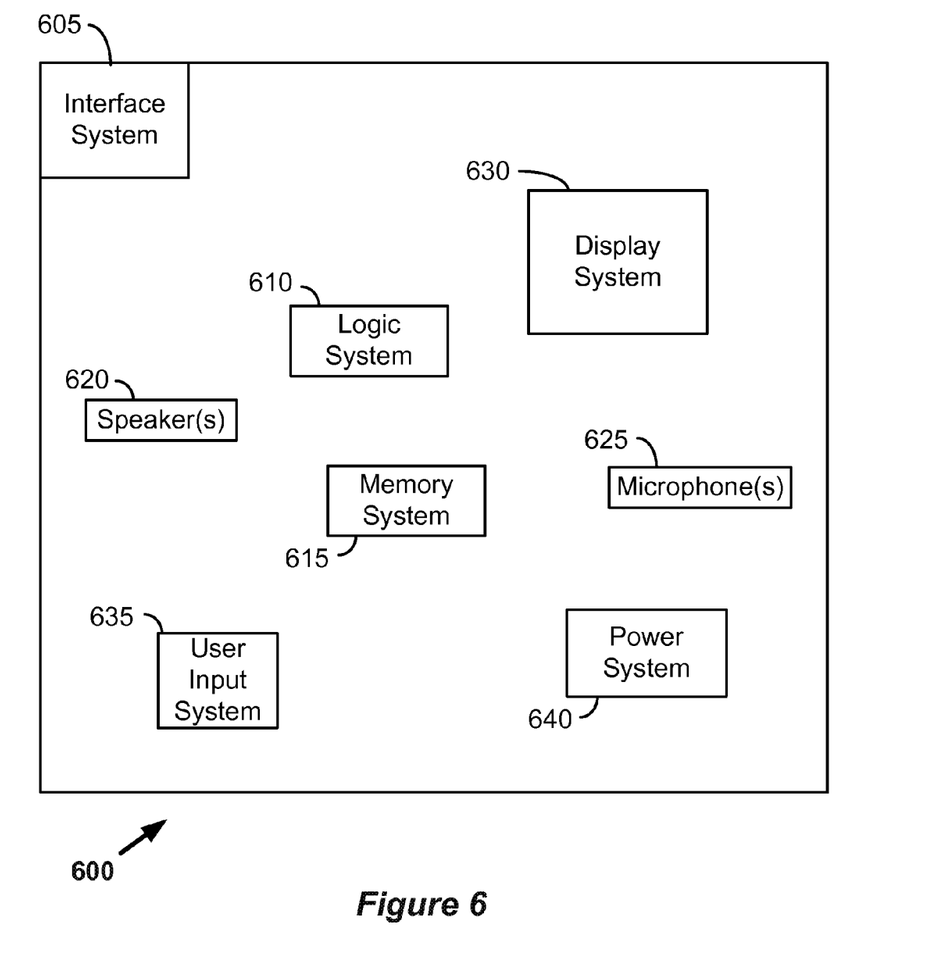
FIG. 6 is a block diagram that provides examples of components of an apparatus that may be used during a teleconference.

FIG. 6 is a block diagram that provides examples of components of an apparatus that may be used during a teleconference. The apparatus may, for example, be (or may be a portion of) an endpoint terminal. In this example, the device 600 includes an interface system 605. The interface system 605 may include a network interface, such as a wireless network interface. Alternatively, or additionally, the interface system 605 may include a universal serial bus (USB) interface or another such interface.

The device 600 includes a logic system 610. The logic system 610 may include a processor, such as a general purpose single- or multi-chip processor. The logic system 610 may include a digital signal processor (DSP), an application specific integrated circuit (ASIC), a field programmable gate array (FPGA) or other programmable logic device, discrete gate or transistor logic, or discrete hardware components, or combinations thereof. The logic system 610 may be configured to control the other components of the device 600. Although no interfaces between the components of the device 600 are shown in FIG. 6, the logic system 610 may be configured with interfaces for communication with the other components. The other components may or may not be configured for communication with one another, as appropriate.

The logic system 610 may be configured to perform, at least in part, the functionality described herein. In some such implementations, the logic system 610 may be configured to operate (at least in part) according to software stored one or more non-transitory media. The non-transitory media may include memory associated with the logic system 610, such as random access memory (RAM) and/or read-only memory (ROM). The non-transitory media may include memory of the memory system 615. The memory system 615 may include one or more suitable types of non-transitory storage media, such as flash memory, a hard drive, etc.

The logic system 610 may be configured to receive frames of encoded audio data via the interface system 605 and to decode the encoded audio data. Alternatively, or additionally, the logic system 610 may be configured to receive frames of encoded audio data via an interface between the memory system 615 and the logic system 610. The logic system 610 may be configured to control the speaker(s) 620 according to decoded audio data.

The display system 630 may include one or more suitable types of display, depending on the manifestation of the device 600. For example, the display system 630 may include a liquid crystal display, a plasma display, a bistable display, etc.

The user input system 635 may include one or more devices configured to accept input from a user. In some implementations, the user input system 635 may include a touch screen that overlays a display of the display system 630. The user input system 635 may include a mouse, a track ball, a gesture detection system, a joystick, one or more GUIs and/or menus presented on the display system 630, buttons, a keyboard, switches, etc. In some implementations, the user input system 635 may include the microphone 625: a user may provide voice commands for the device 600 via the microphone 625. The logic system may be configured for speech recognition and for controlling at least some operations of the device 600 according to such voice commands.

The power system 640 may include one or more suitable energy storage devices, such as a nickel-cadmium battery or a lithium-ion battery. The power system 640 may be configured to receive power from an electrical outlet.

The described embodiments may be implemented in a variety of hardware, software, firmware, etc. For example, aspects of the present application may be embodied in a system, in a device (e.g., a cellular telephone, a portable media player, a personal computer, a server, a television set-top box, a digital video recorder or other media player), a method or a computer program product. Accordingly, aspects of the present application may take the form of a hardware embodiment, a software embodiment (including firmware, resident software, microcodes, etc.) or an embodiment combining both software and hardware aspects. Such embodiments may be referred to herein as a "circuit," "module" or "system." Furthermore, aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability. Thus, the claims are not intended to be limited to the implementations shown herein, but are to be accorded the widest scope consistent with this disclosure, the principles and the novel features disclosed herein.

Various features and aspects will be appreciated from the following enumerated example embodiments ("EEEs"):

EEE 1. A method of monitoring voice quality of a teleconference, the method comprising:
receiving a request for voice quality estimation from a teleconference alarm analyzer; and
in response to receiving the request for voice quality estimation, determining a voice quality metric for an endpoint terminal being used during the teleconference, wherein determining the voice quality metric involves analyzing at least one type of information selected from a group consisting of transmission information and acoustic quality information.

EEE 2. The method of EEE 1, further comprising:
receiving a stream of voice data packets during the teleconference;
ascertaining a transmission metric for the stream of voice data packets, the transmission metric corresponding to at least one type of information selected from a group consisting of packet loss information and jitter information;
determining whether the transmission metric exceeds a first transmission threshold value; and
sending a transmission alarm to the teleconference alarm analyzer if the transmission metric exceeds the first transmission threshold value.

EEE 3. The method of EEE 2, wherein the transmission metric is a downlink transmission metric or an uplink transmission metric.

EEE 4. The method of EEE 2 or EEE 3, wherein determining the voice quality metric requires a greater computational burden than the receiving, ascertaining and determining processes of EEE 2.

EEE 5. The method of any one of EEEs 2-4, further comprising determining whether the transmission metric exceeds a second transmission threshold value, wherein the transmission alarm indicates whether the transmission metric exceeds the first transmission threshold value or the second transmission threshold value.

EEE 6. The method of any one of EEEs 1-5, further comprising:
receiving audio signals via a microphone system of the endpoint terminal, the audio signals including voice signals of a teleconference participant;
ascertaining an acoustic quality metric for the audio signals, the acoustic quality metric corresponding to at least one type of indication selected from a group consisting of echo indications and background noise indications;
determining whether the acoustic quality metric exceeds a first acoustic quality threshold value; and
sending an acoustic quality alarm to an alarm analyzer if the acoustic quality metric exceeds the first acoustic quality threshold value.

EEE 7. The method of EEE 6, wherein determining the voice quality metric requires a greater computational burden than the computational burdens of ascertaining the acoustic quality metric and determining whether the acoustic quality metric exceeds a first acoustic quality threshold value.

EEE 8. The method of EEE 6 or EEE 7, further comprising determining whether the acoustic quality metric exceeds a second acoustic quality threshold value, wherein the acoustic quality alarm indicates whether the acoustic quality metric exceeds the first acoustic quality threshold value or the second acoustic quality threshold value.

EEE 9. The method of any one of EEEs 2-8, wherein the sending process involves sending an alarm to another device.

EEE 10. The method of any one of EEEs 2-9, wherein the sending process involves sending diagnostic information.

EEE 11. The method of any one of EEEs 1-10, wherein the request for voice quality estimation includes diagnostic information.

EEE 12. The method of EEE 10 or EEE 11, wherein the diagnostic information includes at least one type of information selected from a group consisting of transmission information and acoustic quality information.

EEE 13. The method of EEE 1-12, wherein the request for voice quality estimation indicates a level of voice quality estimation.

EEE 14. The method of any one of EEEs 1-13, wherein the endpoint terminal, a teleconference server or another endpoint terminal determines the voice quality metric.

EEE 15. The method of any one of EEEs 1-14, wherein determining the voice quality metric involves analyzing at least one type of information selected from a group consisting of: downlink packet loss information for the endpoint terminal; downlink jitter information for the endpoint terminal; uplink packet loss information for another endpoint terminal; uplink jitter information for another endpoint terminal; codec bitstream information; local preprocessing status information obtained from the endpoint terminal; and remote preprocessing status information obtained from another endpoint terminal.

EEE 16. A non-transitory medium having software stored thereon, the software including instructions for controlling at least one apparatus to perform the method of any one of EEEs 1-15.

EEE 17. An apparatus, comprising:
an interface system; and
a logic system capable of performing the method of any one of EEEs 1-15.

EEE 18. The apparatus of EEE 17, wherein the logic system includes at least one element selected from a group of elements consisting of a general purpose single- or multi-chip processor, a digital signal processor (DSP), an application specific integrated circuit (ASIC), a field programmable gate array (FPGA) or other programmable logic device, discrete gate or transistor logic and discrete hardware components.

EEE 19. The apparatus of EEE 17 or EEE 18, wherein the logic system includes a quality estimator module capable of determining, in response to receiving a request for voice quality estimation via the interface system, a voice quality metric for an endpoint terminal being used during a teleconference, wherein determining the voice quality metric involves analyzing at least one type of information selected from a group consisting of transmission information and acoustic quality information.

EEE 20. The apparatus of any one of EEEs 17-19, wherein the logic system includes an alarm analyzer capable of:
receiving, via the interface system, one or more alarms corresponding to an endpoint terminal being used during a teleconference, the one or more alarms being selected from a group consisting of uplink transmission alarms, downlink transmission alarms and acoustic quality alarms;
analyzing the one or more alarms to determine an alarm score;
determining whether the alarm score exceeds an alarm score threshold; and
sending a request for voice quality estimation to at least one quality estimator module if the alarm score exceeds the alarm score threshold.

EEE 21. The apparatus of any one of EEEs 17-20, further comprising a memory device, wherein the interface comprises an interface between the logic system and the memory device.

EEE 22. The apparatus of any one of EEEs 17-21, wherein the interface comprises a network interface.

What is claimed is:

1. A method of monitoring voice quality of a teleconference, the method comprising:
receiving one or more alarms corresponding to an endpoint terminal being used during a teleconference, the one or more alarms being selected from a group consisting of uplink transmission alarms, downlink transmission alarms and acoustic quality alarms;
analyzing, by an alarm analyzer, the one or more alarms to determine an alarm score;
determining whether the alarm score equals or exceeds an alarm score threshold; and
sending a request for voice quality estimation to at least one quality estimator module if the alarm score exceeds the alarm score threshold.

2. The method of claim 1, wherein providing the voice quality estimation requires a greater computational burden than the receiving, analyzing and determining processes.

3. The method of claim 1, wherein the one or more alarms include a downlink transmission alarm or an acoustic quality alarm received from an endpoint terminal being used during the teleconference.

4. The method of claim 1, wherein the one or more alarms indicate whether a metric exceeds at least one threshold value.

5. The method of claim 1, further comprising:
receiving diagnostic information corresponding to the one or more alarms; and
including at least some of the diagnostic information with the request for voice quality estimation.

6. The method of claim 1, further comprising:
determining a transmission metric for a stream of voice data packets, the transmission metric corresponding to at least one type of information selected from a group consisting of packet loss information and jitter information;
ascertaining whether the transmission metric exceeds a first transmission threshold value; and
sending a transmission alarm to the alarm analyzer if the transmission metric exceeds the first transmission threshold value, and optionally
wherein providing the voice quality estimation requires a greater computational burden than the computational burdens of determining the transmission metric and ascertaining whether the transmission metric exceeds a first transmission threshold value.

7. The method of claim 6, further comprising determining whether the transmission metric exceeds a second transmission threshold value, wherein the transmission alarm indicates whether the transmission metric exceeds the first transmission threshold value or the second transmission threshold value.

8. The method of claim 1, wherein one or more endpoint terminals include a quality estimator module, further comprising determining, by the alarm analyzer, one or more endpoint terminals to which the request for voice quality estimation will be sent.

9. The method of claim 8, wherein determining the one or more endpoint terminals to which the request for voice quality estimation will be sent involves determining that the request for voice quality estimation will be sent to at endpoint terminal.

10. The method of claim 9, wherein determining that the request for voice quality estimation will be sent to the $j^{th}$ endpoint terminal involves determining at least one condition selected from a group of conditions consisting of: a downlink transmission alarm from endpoint terminal j indicates a high alert; one or more uplink transmission alarms corresponding to endpoint terminals other than j indicate a high alert; a downlink transmission alarm from endpoint terminal j indicates medium alert and one or more uplink transmission alarms corresponding to endpoint terminals other than j indicate a medium alert; an acoustic quality alarm from endpoint terminal j indicates a high alert; and an acoustic quality alarm from endpoint terminal j indicates a medium alert and one or more downlink transmission alarms corresponding to endpoint terminals other than j indicate a medium alert.

11. The method of claim 1, wherein a teleconference server includes a quality estimator module, further comprising:
receiving, by the quality estimator module, the request for voice quality estimation; and, in response to receiving the request for voice quality estimation,
determining a voice quality metric for an endpoint terminal being used during the teleconference, wherein estimating voice quality involves analyzing at least one type of information selected from a group consisting of transmission information and acoustic quality information.

12. The method of claim 1, wherein the request for voice quality estimation indicates a level of voice quality estimation.

13. The method of claim 12, wherein each level corresponds with a computational burden of a voice quality estimation process.

14. The method of claim 1, wherein the request for voice quality estimation indicates that determining the voice quality metric will involve analyzing at least one type of information selected from a group consisting of: downlink packet loss information for a first endpoint terminal; downlink jitter information for the first endpoint terminal; uplink packet loss information for a second endpoint terminal; uplink jitter information for a second endpoint terminal; codec bitstream information; preprocessing status information obtained from a first endpoint terminal; and preprocessing status information obtained from a second endpoint terminal.

15. The method of claim 14, wherein the first endpoint terminal or the second endpoint terminal is an endpoint terminal to which a request for voice quality estimation will be sent.

16. An apparatus for monitoring voice quality of a teleconference, the apparatus comprising:
a receiver configured to receive one or more alarms corresponding to an endpoint terminal being used during a teleconference, the one or more alarms being selected from a group consisting of uplink transmission alarms, downlink transmission alarms and acoustic quality alarms;
an alarm analyzer configured to analyze the one or more alarms to determine an alarm score;
a comparator configured to determine whether the alarm score equals or exceeds an alarm score threshold; and
a transmitter configured to send a request for voice quality estimation to at least one quality estimator module if the alarm score exceeds the alarm score threshold.

17. A non-transitory computer readable storage medium comprising a sequence of instructions which, when performed by one or more processing devices, cause the one or more processing devices to perform a method of monitoring voice quality of a teleconference, the method comprising:
receiving one or more alarms corresponding to an endpoint terminal being used during a teleconference, the one or more alarms being selected from a group consisting of uplink transmission alarms, downlink transmission alarms and acoustic quality alarms;
analyzing, by an alarm analyzer, the one or more alarms to determine an alarm score;
determining whether the alarm score equals or exceeds an alarm score threshold; and
sending a request for voice quality estimation to at least one quality estimator module if the alarm score exceeds the alarm score threshold.

* * * * *